US009248810B2

(12) United States Patent
Olofsson

(10) Patent No.: US 9,248,810 B2
(45) Date of Patent: Feb. 2, 2016

(54) ACCELERATOR BRAKING MODULE

(71) Applicant: Erland George Olofsson, North Rocks (AU)

(72) Inventor: Erland George Olofsson, North Rocks (AU)

( * ) Notice: Subject to any disclaimer, the term of this patent is extended or adjusted under 35 U.S.C. 154(b) by 121 days.

(21) Appl. No.: 13/913,239

(22) Filed: Jun. 7, 2013

(65) Prior Publication Data

US 2013/0338894 A1 Dec. 19, 2013

Related U.S. Application Data

(63) Continuation-in-part of application No. 12/733,249, filed as application No. PCT/AU2008/001213 on Aug. 21, 2008, now abandoned.

(30) Foreign Application Priority Data

Aug. 21, 2007 (AU) ................................. 2007904505
Oct. 31, 2007 (AU) ................................. 2007231765

(51) Int. Cl.
*B60T 7/04* (2006.01)
*B60T 8/32* (2006.01)
*B60T 13/66* (2006.01)
*G05G 1/30* (2008.04)

(52) U.S. Cl.
CPC .............. *B60T 7/042* (2013.01); *B60T 8/3275* (2013.01); *B60T 13/66* (2013.01); *G05G 1/30* (2013.01); *B60L 2250/26* (2013.01); *B60T 2201/03* (2013.01); *B60T 2201/12* (2013.01); *B60W 2540/10* (2013.01)

(58) Field of Classification Search
CPC ... B60T 8/3275; B60T 2201/12; B60T 13/66; B60T 2201/03; B60T 7/04; B60T 7/042; B60W 2540/10; B60W 40/09; B60L 2250/26; G05G 1/30
USPC .......................................................... 701/70
See application file for complete search history.

(56) References Cited

U.S. PATENT DOCUMENTS

| 3,082,851 | A | | 3/1963 | Sheriff | |
|---|---|---|---|---|---|
| 3,726,369 | A | * | 4/1973 | Esteves | ......................... 477/184 |
| 3,891,071 | A | | 6/1975 | Tuzson | |
| 5,921,641 | A | * | 7/1999 | Lupges et al. | ............... 303/191 |
| 6,155,385 | A | | 12/2000 | Basnett | |
| 6,296,326 | B1 | | 10/2001 | Steiner et al. | |
| 6,350,217 | B1 | * | 2/2002 | Unterforsthuber | ........... 477/174 |
| 6,351,701 | B2 | | 2/2002 | Minowa et al. | |
| 6,493,621 | B2 | * | 12/2002 | Tamura et al. | .................. 701/70 |
| 6,554,744 | B2 | * | 4/2003 | Schmidt | ........................ 477/208 |
| 6,994,407 | B2 | | 2/2006 | Kinder et al. | |

(Continued)

FOREIGN PATENT DOCUMENTS

WO     WO 01/89872     11/2001

*Primary Examiner* — Jason Holloway
(74) *Attorney, Agent, or Firm* — Knobbe Martens Olson & Bear LLP

(57) ABSTRACT

An accelerator pedal operated braking system for an automatic transmission vehicle; said braking system including monitoring of angular data and angular rate of change data of an accelerator pedal of said vehicle; said system further including a control module and an actuator acting on the brake pedal of said vehicle; said braking system responsive to said angular data and angular rate of change data.

22 Claims, 8 Drawing Sheets

(56) References Cited

U.S. PATENT DOCUMENTS

| | | |
|---|---|---|
| 7,188,546 B2 | 3/2007 | Olofsson |
| 7,908,071 B2 * | 3/2011 | Nakayama ............... 701/70 |
| 2002/0026273 A1 * | 2/2002 | Tamura et al. ............ 701/70 |
| 2002/0029914 A1 * | 3/2002 | Schmidt ............... 180/175 |
| 2002/0091478 A1 * | 7/2002 | Tamura et al. ............ 701/70 |
| 2004/0099085 A1 * | 5/2004 | Olofsson ............... 74/513 |
| 2008/0086252 A1 * | 4/2008 | Nakayama ............... 701/80 |
| 2010/0152988 A1 * | 6/2010 | Olofsson ............... 701/70 |

* cited by examiner

ACCELERATOR BRAKING MODULE

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

The present invention relates to control systems for motor vehicles and, more particularly to the interaction of acceleration and braking of a vehicle and even more particularly to a modular electronic device for implementing same.

It is well known that the distance required to bring a moving vehicle to a standstill from the instant a driver perceives a potentially hazardous situation to the vehicle coming to rest, is a combination of the reaction distance and the braking distance.

The reaction distance is that distance covered during the delay between which the mind of the driver perceives the situation and decides to act, to the actual activating of the vehicles braking system. The braking distance is that distance actually required to bring the vehicle to a standstill from the speed at which it was travelling under the application of the optimum braking force.

Both the reaction distance and the braking distance are clearly functions of the initial speed of the vehicle, while the braking distance is additionally affected by road and weather conditions as well as the efficiency of the braking system.

Improvements in braking systems have significantly reduced the braking distance in emergency situations, while the reaction distance has tended to remain relatively stable. A disadvantage in conventional vehicle control systems in an emergency situation is that the reaction distance is partly made up of the time taken to physically lift the driver's foot from the accelerator pedal, transfer it to the brake pedal and depress that pedal.

Conventional control systems also are inconvenient in non-emergency braking situations. For example in "stop start" traffic situations, the need to repeatedly transfer the driver's foot from one pedal to the other can become very tiring.

The applicant's earlier filed International Patent Application number PCT/AU01/00582 and prior art U.S. Pat. No. 3,082,851 to Sheriff disclose substantially mechanical arrangements. However such arrangements are prone to failure and are difficult to calibrate. They can also be difficult to retrofit. They can also be difficult to customise "on the fly" to suit the preferences of the individual driver.

It is an object of the present invention to address or ameliorate some of the above disadvantages.

Notes
1. The term "comprising" (and grammatical variations thereof) is used in this specification in the inclusive sense of "having" or "including", and not in the exclusive sense of "consisting only of".
2. The above discussion of the prior art in the Background of the invention, is not an admission that any information discussed therein is citable prior art or part of the common general knowledge of persons skilled in the art in any country.

BRIEF DESCRIPTION OF INVENTION

Accordingly, in a first broad form of the invention, there is provided an accelerator pedal operated braking system for an automatic transmission vehicle; said braking system including monitoring of angular data and angular rate of change data of an accelerator pedal of said vehicle; said system further including a control module and an actuator acting on the brake pedal of said vehicle; said braking system responsive to said angular data and angular rate of change data Preferably, said braking system is triggered to apply at least a percentage of maximum braking force when a negative angular rate of change of said accelerator pedal exceeds a predefined threshold value.

Preferably, said angular data and said angular rate of change data of said accelerator pedal are monitored by an encoder responsive to rotation of said accelerator pedal.

Preferably, said encoder is an original equipment encoder of an electronically enabled accelerator pedal or an encoder retrofitted to said accelerator pedal.

Preferably, said actuator of said vehicle is connected to said brake pedal; said actuator responsive to said angular status and angular rate of change as monitored by said control module of said system; said actuator arranged to depress said brake pedal from a default zero applied braking force position to at least a percentage of a maximum applied braking force position.

Preferably, said control module receives a signal from said vehicles' engine management system; said signal indicating instantaneous said angular status and angular rate of change of said accelerator pedal.

Preferably, while said braking system is in activate mode, operation of said accelerator pedal is modified from a standard default operating mode in which all movement of said accelerator pedal varies RPM of an engine of said vehicle, to an operating mode in which a portion of movement of said accelerator pedal has no effect on said engine RPM.

Preferably, while said engine is in idle mode such that said accelerator pedal is in a default fully retracted position, and when said braking system is in activated mode, said actuator acts on said brake pedal to apply maximum braking force.

Preferably, while said engine is initially in idle mode and said braking system is in activated mode, a first zone of rotation of said accelerator pedal from a default non-rotated angle to a first rotated angle causes said actuator to gradually reduce braking force from a maximum applied braking force to zero applied braking force; said first zone of rotation forming a first portion of said movement of said accelerator pedal during which an increase in engine RPM is insufficient to urge said vehicle into motion.

Preferably, while said braking system is in activated mode, a second zone of rotation of said accelerator pedal from said first rotated angle to a second rotated angle forms a second portion of said movement of said accelerator pedal during which said system applies zero braking force.

Preferably, while said braking system is in activated mode, a final zone of rotation of said accelerator pedal from said second rotation angle to a maximum rotated position controls change of said engine RPM to full power.

Preferably, signals from said encoder are routed through said control module to said engine management system of said vehicle; said control module modifying said signals to divide rotation of said accelerator pedal into first, second and third zones.

Preferably, when said system is enabled and said engine of said vehicle is on, during rotation of said accelerator through said first zone extending from zero rotation to a first angle of rotation, said braking force applied by said system decreases from a maximum to zero braking force, and wherein engine RPM remains at idle during said rotation.

Preferably, during rotation of said accelerator pedal through said second zone engine RPM remains at idle; rotation through said third zone increasing engine RPM from idle to full power.

Preferably, said control module provides for said final zone of rotation to control engine RPM over the same range as the range over full movement of said accelerator pedal when said braking system is in deactivated mode.

Preferably, while said braking system is activated and said vehicle is in motion and while said pedal angle is in said final zone of rotation, a negative rotational change of said accelerator pedal towards said second rotation angle at said angular rate of change exceeding said predefined threshold value, causes said actuator to act on said brake pedal to apply at least said percentage of maximum braking force.

Preferably, wherein said system is switchable from a deactivated mode to an activated mode by means of a control cluster mounted proximate to an operator of said vehicle.

Preferably, said control cluster includes a selector for selection of said at least a percentage of said maximum braking force.

Preferably, while said system is in said activated mode, contact of an operator's foot with said brake pedal switches said system to a deactivated state.

Preferably, said control module is provided with an input port for connection of a programming device; said programming device provided with software enabling customization of operating parameters of said system.

Preferably, when a stall situation is detected, and said braking system is in activated mode, the brakes remain applied until the vehicle engine is restarted, and wherein starting said engine after a stall event deactivates said braking system.

In another broad form of the invention, there is provided a method of operating a vehicle braking system by means of an accelerator pedal of said vehicle; said method including the steps of:

monitoring current angle data and rate of angular change data of said accelerator pedal by means of an encoder, linking an actuator to a brake pedal of said vehicle, providing a control module linked to said encoder and to said actuator, and
wherein said angular data and said angular rate of change data control activation of said actuator to depress said brake pedal to provide at least a percentage of maximum braking force to said vehicle.

In yet another broad form of the invention, there is provided a method of arresting a stationary vehicle in a braked condition; said method including the steps of:

providing a sensor at an accelerator pedal of said vehicle; said sensor providing angular and angular rate of change data to a control module of a braking system of said vehicle;
while said braking system is in an activated mode and while said sensor records a zero angular rotation of said accelerator pedal, said control module activates an actuator connected to a brake pedal of said vehicle to apply a maximum braking force.

BRIEF DESCRIPTION OF DRAWINGS

Embodiments of the present invention will now be described with reference to the accompanying drawings wherein.

DETAILED DESCRIPTION OF PREFERRED EMBODIMENTS

First Preferred Embodiments

Figure 3:
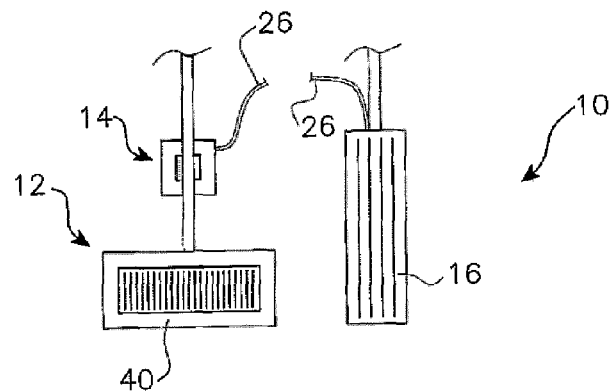
FIG. 3 is a general schematic of the accelerator and brake pedal controls of a vehicle fitted with the accelerator brake system of the present invention.

With reference to FIG. 3, the controls of a typical motor vehicle include an accelerator pedal 10 and a brake pedal 12. Although a vehicle equipped with a manually operated gear train may be additionally equipped with a clutch pedal, the present invention is concerned only with the two pedals, accelerator pedal 10 and brake pedal 12.

In practise embodiments of the present invention are suited to conventional automatic transmission equipped vehicles which have only an accelerator pedal and a brake pedal and do not have a third clutch pedal to assist changing gears.

Figure 4:
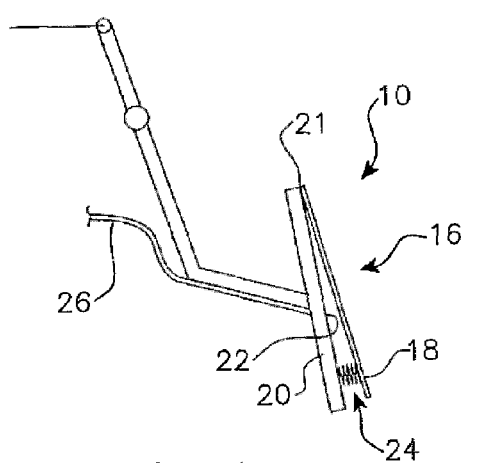
FIG. 4 is a schematic of a secondary reactive surface attached to an accelerator pedal according to a first preferred embodiment of the accelerator brake system of the invention.

As also shown in FIG. 3, the brake pedal 12 according to the invention, is provided with a control module 14, the function of which will be explained in more detail below. As best seen in FIGS. 3 and 4, the accelerator pedal 10 is provided with a secondary reaction surface 16.

Secondary reaction surface 16 in a first preferred embodiment shown in FIG. 4, comprises an auxiliary pedal 18, attached to a standard accelerator pedal 20 by a hinge 21, and covers at least a portion of the accelerator pedal 20. In this instance, the auxiliary pedal 18 is arranged so it can be depressed against a spring 24 a certain amount relative to the surface 22 of accelerator pedal 20, without inducing movement in accelerator pedal 20. When pressure is applied by the foot of a driver (not shown) past this point, the pressure applied is transmitted to the accelerator pedal 20, causing it to depress and urge the vehicle into motion in the usual way.

Auxiliary pedal 18 is thus arranged to move between a first deactivated state shown in FIG. 4, (when there is a maximum possible movement between the auxiliary pedal 18 and the surface 22 of pedal 20), and the fully activated state at the point where further application of pressure will induce movement in accelerator pedal 20. This movement between the deactivated state and the fully activated state is monitored by a sensor in this instance implemented in the form of a potentiometer and relayed by lead 26 to control module 14 as force data.

Figure 5:
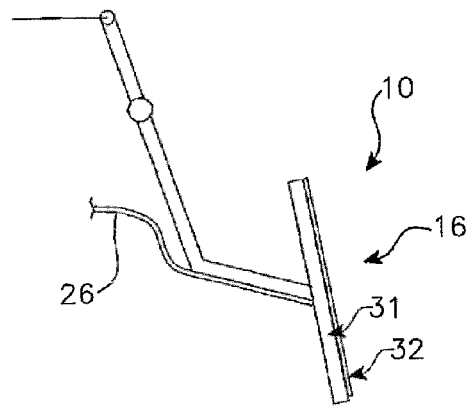
FIG. 5 is a schematic of a secondary reactive surface attached to an accelerator pedal according to a second preferred embodiment of the accelerator brake system of the invention.

With reference now to FIG. 5, in a second preferred embodiment of a secondary reaction surface 32, accelerator pedal 16 has attached to its surface a pressure sensitive mat 32. Pressure sensitive mat 32 monitors, for example via a load cell (not shown), pressures applied to secondary reaction surface of mat 32 between a minimum and that pressure required to depress the accelerator pedal to the point at which engine rpm is increased and the vehicle urged into motion.

Figure 1:
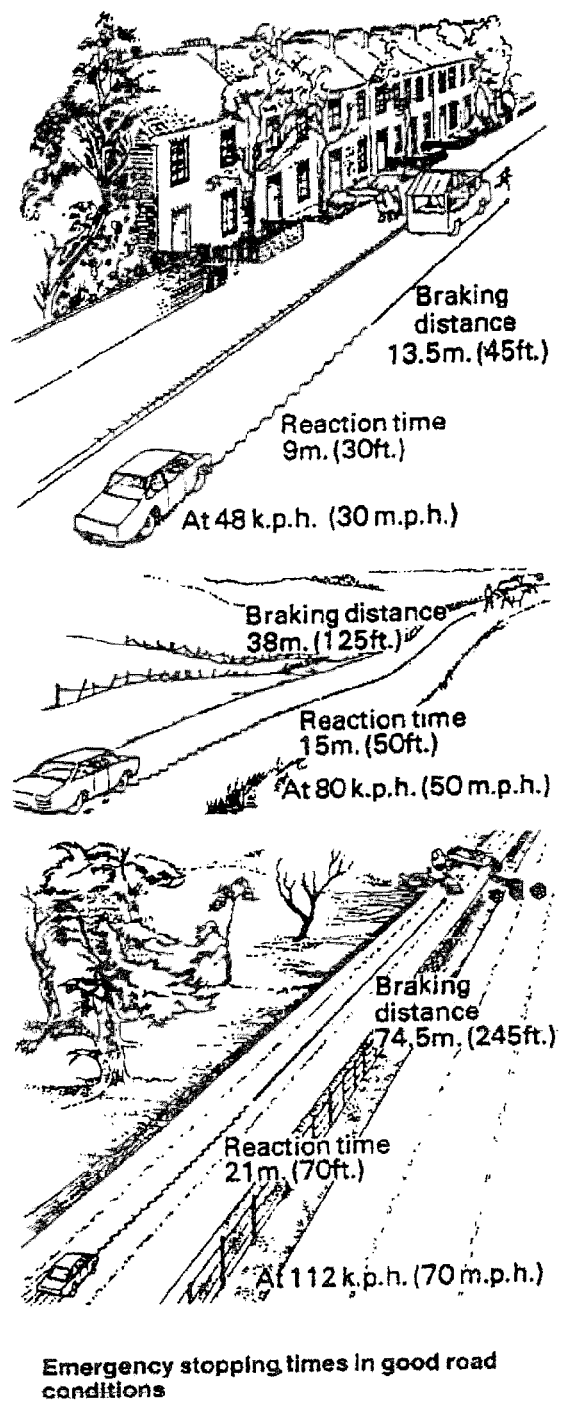
FIG. 1 (Prior Art) is an illustration of the two components, reaction distance and braking distance at various speeds which determine the overall distance required to bring a vehicle to a standstill from a first perceived need by a driver to do so, FIG. 2 comprises prior art disclosure from applicant's earlier filed International Patent Application no PCT/AU01/00582 illustrating preferred braking characteristics to be imparted as part of accelerator pedal operation.
Figure 2:
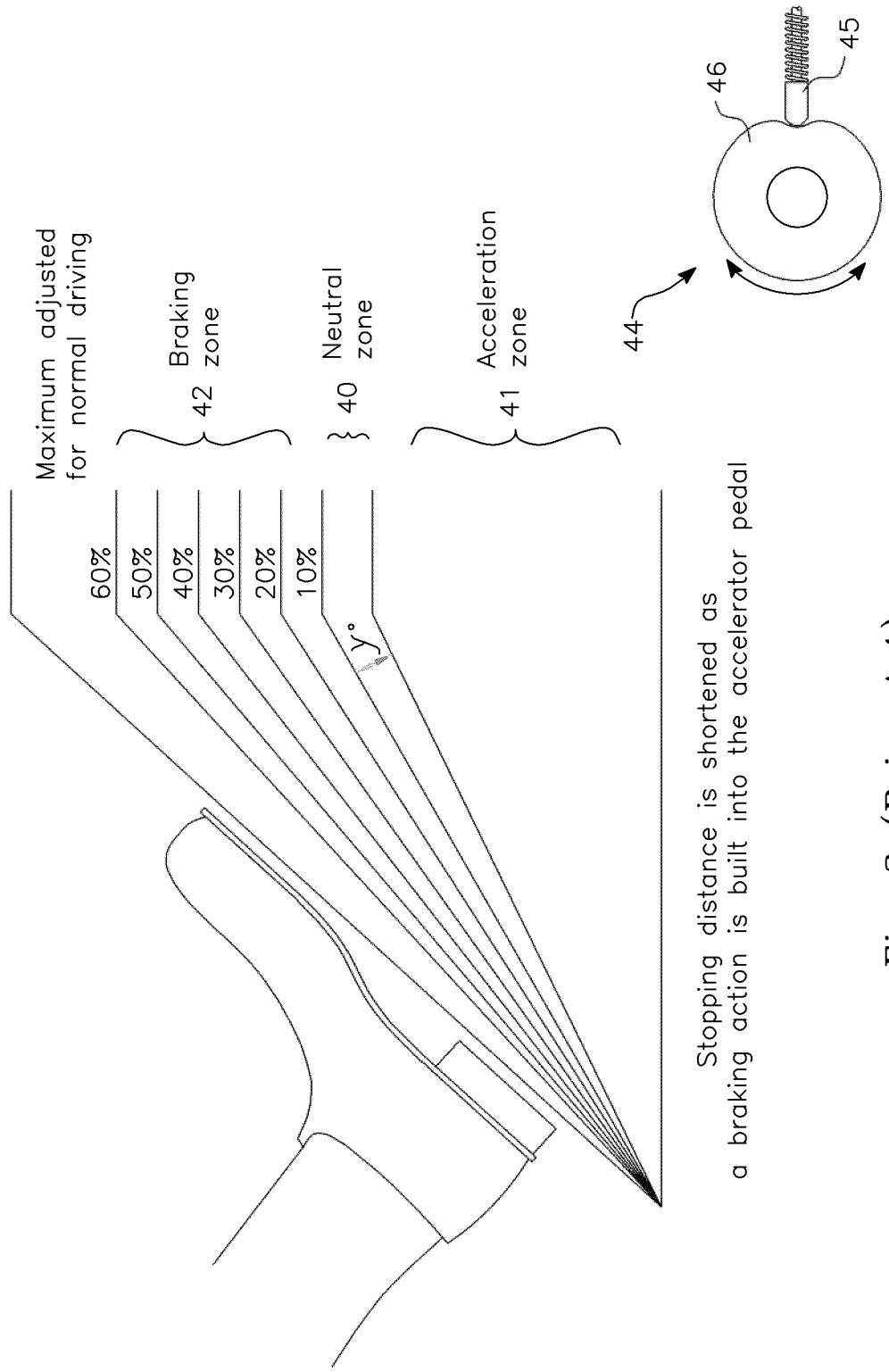

It will be understood, that in each of the embodiments, the pressure which needs to be applied either to the auxiliary pedal 18 or to pressure sensitive mat 32 to operate the system from a deactivated state to a fully activated state, must be less than the pressure required to depress the accelerator pedal. Preferably, the difference in pressures is such that there is a noticeable neutral feel zone perceptible to a driver. In a preferred form this is implemented by way of a mechanical detent (refer inset in FIG. 2). Also in a preferred form a switch is activated in this zone causing illumination of "coasting" light on the dashboard of the vehicle.

Figure 6:
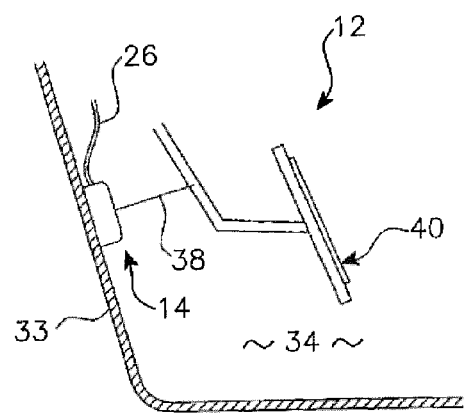
FIG. 6 is a brake pedal module.

In each of the preferred embodiments, either the sensor of auxiliary pedal 18, or the load cell of pressure sensitive mat 32, is in electronic communication with control module 14 via lead 26. As best seen in FIG. 6, control module 14 is mounted rearward of arm 32 of brake pedal 12, either on the inside of the firewall 33 or foot well 34 where space permits, or in the engine bay on the outside of firewall 33. Control module 14 includes control and logic circuitry and a servomotor (not shown). The servomotor may take the form of a linear or rotary actuator which acts on a coupling 38 between the control module 14 and brake pedal arm 32. Coupling 38 is flexible, preferably a cable, so that the brake pedal 12 may be activated manually by pressure from the driver's foot regardless of the state of the actuator of control module 14.

In response to signals received from the sensor of auxiliary pedal 18 or the load cell of pressure sensitive mat 32 mounted at the accelerator pedal 10, the servomotor acts to vary the depression of brake pedal 12 from its first deactivated state as shown in FIG. 6, to a maximum activated state, that is the state of depression commensurate with at least a percentage of maximum available braking force.

Referring again to FIG. 6, brake pedal 12 is provided on its surface with a secondary reaction surface, in this instance a pressure sensitive pad 40, incorporating a switch (not shown). Immediately pressure is applied to the brake pedal via pad 40 by the foot of a driver, the switch disables control module 14, so that manual control of braking action is returned to the driver.

Mounted within easy reach of the driver, preferably on the dashboard or, in a system fitted to a vehicle as original equipment, incorporated in the wiper or indicator stalks, is an enable control 7 for control module 14. The control can comprise an illuminated button which illuminates when and only when the system is on. By means of this control, a driver may select to operate the vehicle's braking system via the accelerator, or to retain normal manual control of the brake pedal.

Also mounted within easy reach of the driver are two dial controls, by which operating characteristics of the accelerator braking system of the invention may be modified to suit the preferences of a driver. The first of these controls 3 allows a driver to vary the rate at which the servo motor of the control module 14 responds to input signals received from the accelerator pedal's secondary reaction surface. The second control 4 allows the driver to select the percentage of the maximum available braking force of the vehicle as the maximum to be applied by the control module 14.

Preferably, the system is further provided with an indicator light 8 mounted in view of the driver which indicates when the secondary reaction surface and the accelerator pedal are in the neutral feel zone, that is to say, when a moving vehicle is coasting, with no acceleration applied to the engine or any retarding force applied by the brakes.

In Use

Figure 7:
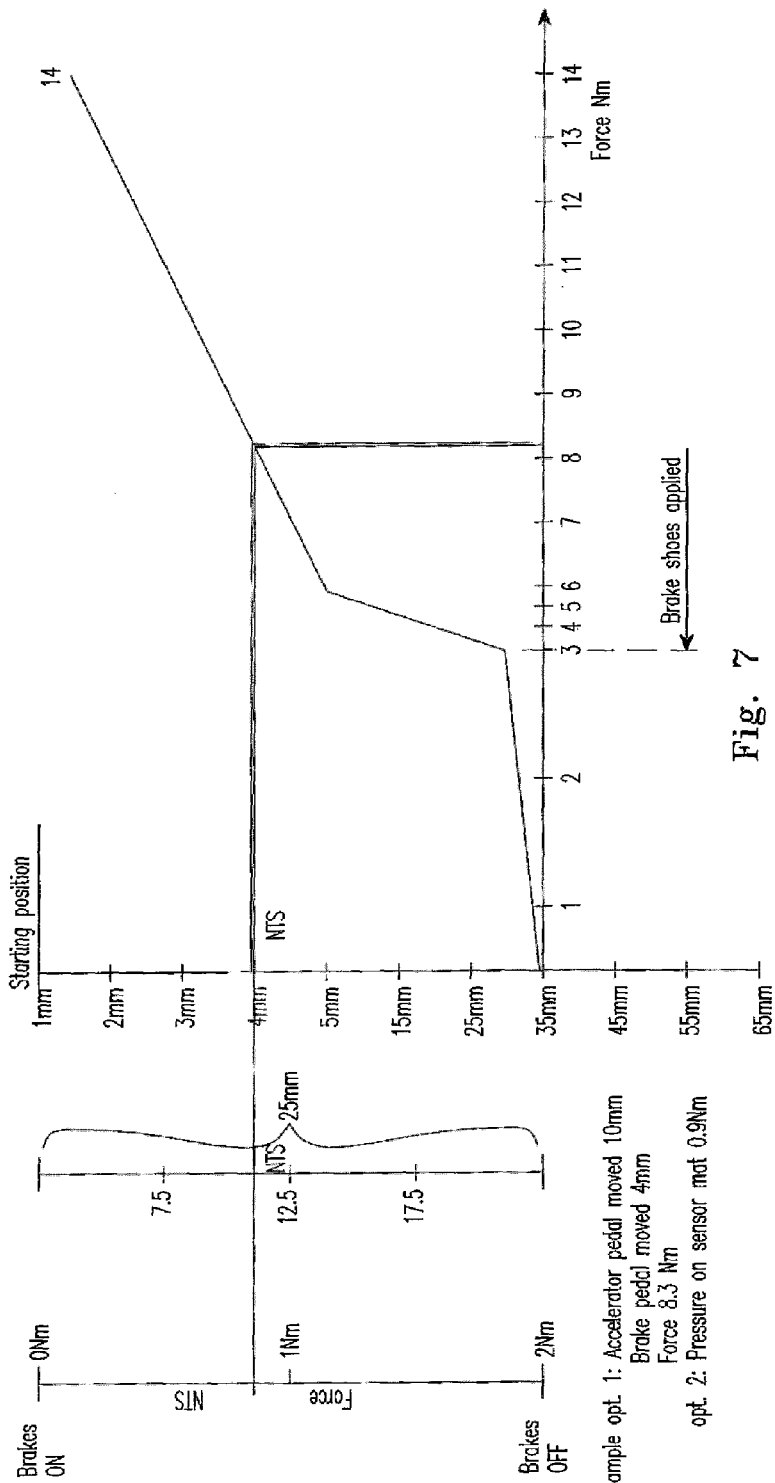
FIG. 7 is a graph representing the interaction of the accelerator pedal, brake pedal and braking force of the accelerator brake system of FIGS. 3 to 6.
Figure 8:
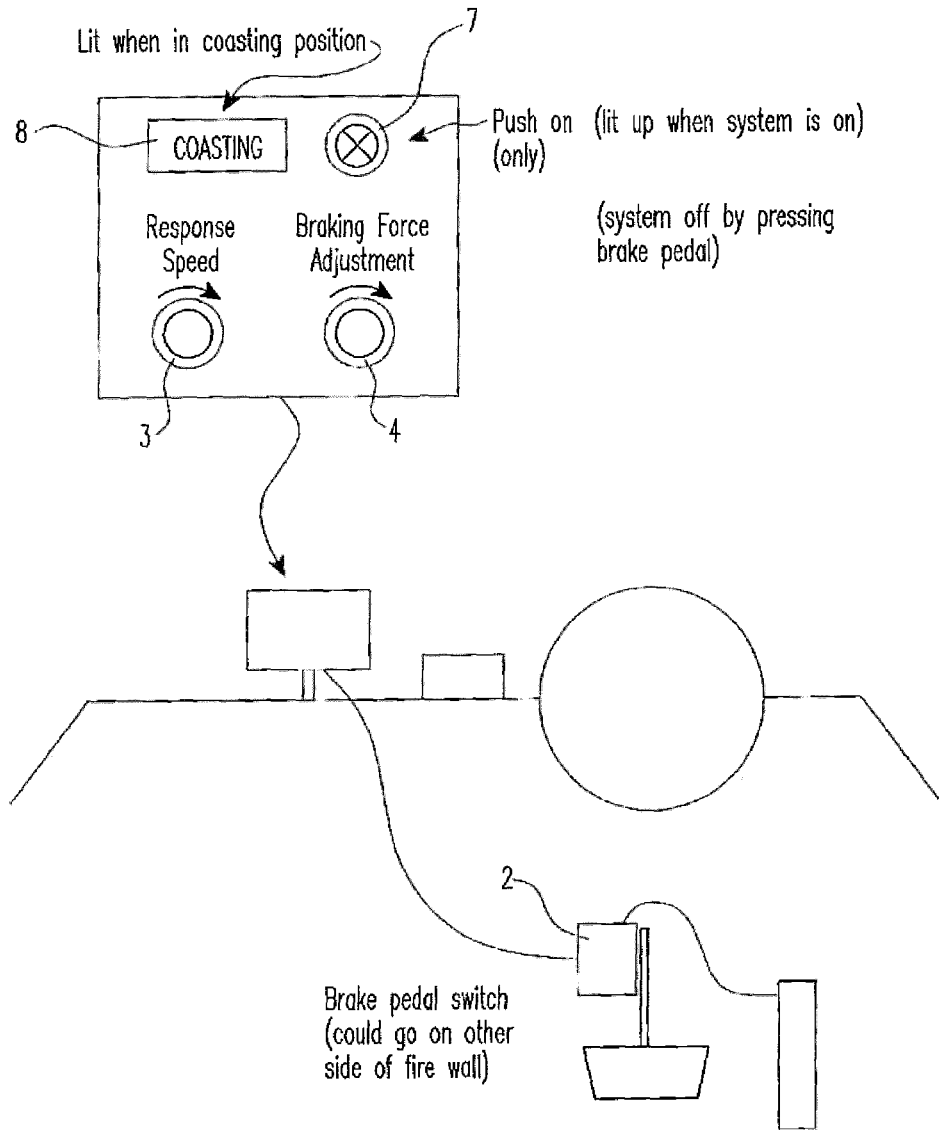
FIG. 8 is a lay out of an installation of at least a preferred embodiment of the present invention in the cabin of a vehicle.
Figure 9:
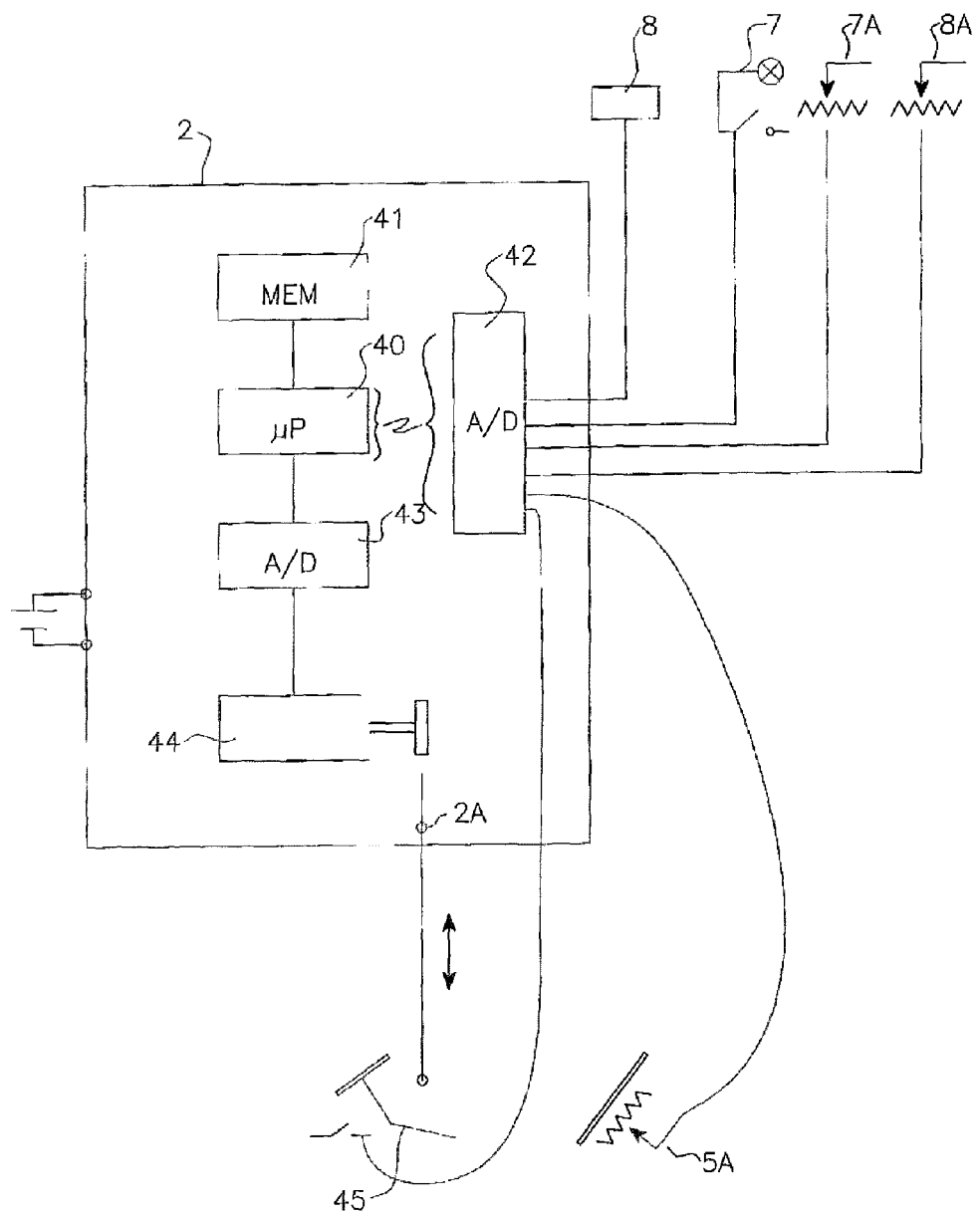
FIG. 9 is a block diagram of an electronic implementation of the modular arrangement of FIG. 8.

FIG. 7 shows graphically an example of the interaction of either, pressure applied to the pressure sensitive mat 32, or the movement of auxiliary pedal 18, with the operation of the vehicle's brakes.

In this example, at vehicle start up, with the accelerator braking system of the invention enabled, the control module 14 holds the brake pedal 12 in a depressed state to exert a braking force of 14 Nm (the maximum braking force selected by the driver). At this point, the auxiliary pedal 18 has not moved relative to the surface 22 accelerator pedal 20. In the case of the pressure sensitive mat 32, its load cell reads a minimum of zero Nm.

It can be seen from the graph, that as pressure is applied to the secondary reaction surface of the accelerator pedal, braking force decreases under the programmed control of the control module 14. Thus in the case of the auxiliary pedal 18, when, in this example, it has moved its full travel of approximately 25 mm, the brakes are fully off. This is equivalent to an increase in pressure on the pressure sensitive mat 32 from the initial reading of zero Nm to two Nm. In the example of FIG. 7, a movement of 10 mm of the auxiliary pedal 18, is translated by the control module 14 servo motor as 25 mm of releasing movement of the brake pedal from its maximum braking state, with a concomitant reduction in the braking force to 8.3 Nm.

Referring still to FIG. 7, when the vehicle is in motion and the accelerator braking system is enabled, a driver may remove pressure on the secondary reaction surface (and thus on the accelerator pedal) to the point where the accelerator pedal is fully retracted from its depressed state. Further reduction of pressure then begins to reduce the depression of auxiliary pedal 18 from its maximum deflection of 25 mm (or the reduction of pressure on pressure sensitive mat 32 from 2 Nm). This causes the control module to gradually depress the brake pedal and apply a corresponding proportion of the maximum set braking force, bringing the vehicle to a braked standstill.

It will be clear that a sudden release of any pressure on the accelerator pedal and the secondary reaction surface will bring the maximum set braking force into play within the adjustable reaction time of the control module 14 and its actuator. This reaction time will be significantly shorter than the time it takes a driver to bring his leg and foot from the accelerator position to the brake pedal and depressing that pedal. Thus in an emergency, the initiation of considerable braking force can be applied more quickly, giving the driver time to then take over and apply manually (if required) the full braking force available from the vehicle's braking system.

The advantage of the present system in a stop/start traffic situation, is that by simply manipulating the accelerator pedal, a driver may alternatively bring the vehicle into motion and to a braked standstill. This is particularly advantageous in an automatic vehicle in which typically creep, even with the accelerator pedal completely released, forces a driver to manually apply the brakes each time the vehicle needs to be brought to a standstill.

Further Embodiments

In further embodiments of the invention, a braking system is again arranged for application to automatic vehicles, that is, vehicles in which motion is controlled by only an accelerator pedal and a brake pedal.

In these embodiments however, the system does not rely on an auxiliary hinged pedal attached to the accelerator pedal, or on a pressure sensitive pad applied to its surface as in the above described embodiments. Instead, the system relies on instantaneous angular data and angular rate of change data provided by a rotary encoder or potentiometer responsive to rotation of the accelerator pedal. The encoder may be retrofitted or, in the case of an electronically enabled accelerator pedal, the system of the invention may derive angular and rate of change data from the original equipment encoder.

Figure 10:
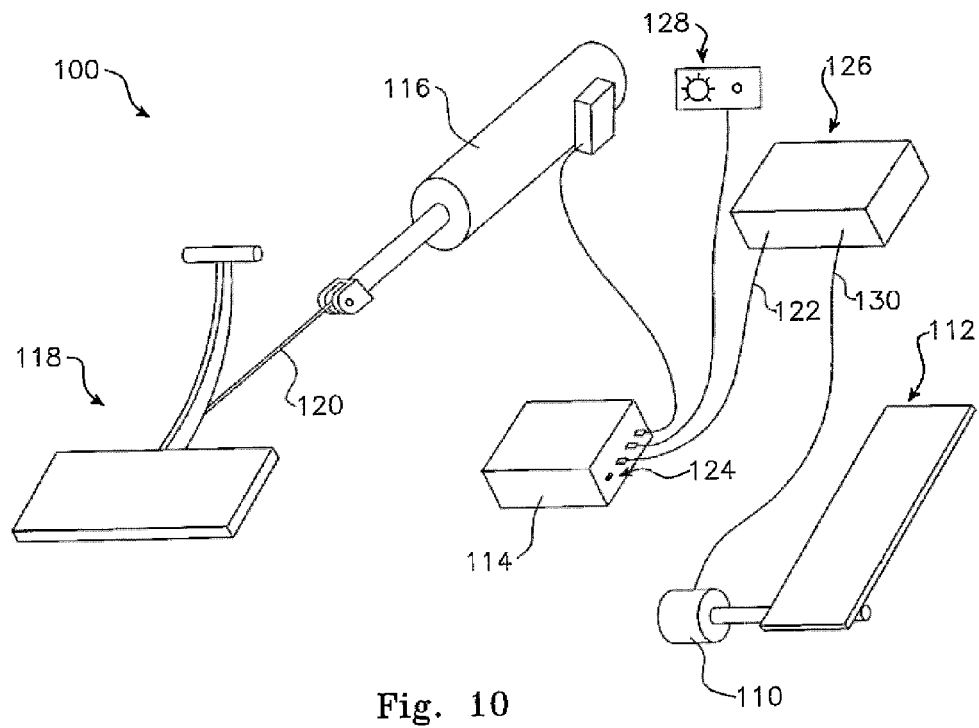
FIG. 10 is a schematic of a further embodiment of the invention.

As illustrated in the schematic diagram of FIG. 10, the system 100 of the present embodiments in its basic form comprises the vehicle's accelerator encoder 110, responsive to rotation of accelerator pedal 112, an electronic control module 114 and an actuator 116 linked to the brake pedal 118. As in the above embodiments, the linkage 120 between the actuator 116 and the brake pedal 118, is preferably in the form of a flexible cable. In a preferred arrangement, the electrical load on the actuator is monitored so that if any pressure is applied to the brake pedal by the vehicle's operator, the decreased load on the actuator is detected, the actuator releases and the accelerator braking system is thus instantly disabled.

In similar manner to the earlier described embodiments above, activation of the braking system 100 is optional, so that the vehicle operator is provided with a conveniently mounted control cluster for both activation and control of the braking force to be applied under various operating conditions, as will be further described below.

In addition to manual override control, whenever the system 100 is activated and the vehicle in motion, any depression of the brake pedal 118 will, as noted above, deactivate the system. In one preferred arrangement, the system may be reset after a manual braking event.

An indicator light on the control cluster indicates if the braking system is in activated mode. In these respects, the operation of the system of these embodiments is similar to that of cruise control. In an alternative preferred arrangement, the system cannot be reactivated until the vehicle is stationary and the transmission has been shifted to "PARK".

Again, in similar manner to cruise control, the system 100 is deactivated when the vehicle's engine is switched off In vehicles with cruise control, the system may make use of the cruise control deactivating signal which is generated in response to any depression of the brake pedal. In a retrofitted arrangement of the invention, as an alternative to decreased load sensing at the actuator 116, a suitable sensor is provided at the brake pedal, for example in the form of a pressure sensitive pad applied to the brake pedal surface, as described in the first preferred embodiments above.

It will be understood that in vehicles with cruise control, there will be no activation of the braking system of the invention while the vehicle is in motion under cruise control. This is so because no braking system triggering signals will be generated by the accelerator pedal encoder while under cruise control.

With reference to FIG. 10 in one preferred arrangement, the engine management system 126 receives instantaneous accelerator pedal 112 status via cable 130. Control module 114 in turn receives a feed of accelerator status signals from the engine management system 126 via cable 122. The USB port 124 on the control module 114 for this connection to the engine management system, or an additional USB port, provides for the connection of a programming device, for example a lap top computer (not shown) provided with software for customizing the operation of the system.

The programming of the control module 114 involves the interpretation of the current angle and the negative rates of change of angle of the accelerator pedal 112 from the signals received by the control module from the engine management system 126. "Negative" rates of change of angle here refers to the rate at which the accelerator pedal is "let up" towards its default undepressed angle by the partial or full removal of pressure from the vehicle operator's foot.

Figure 11:
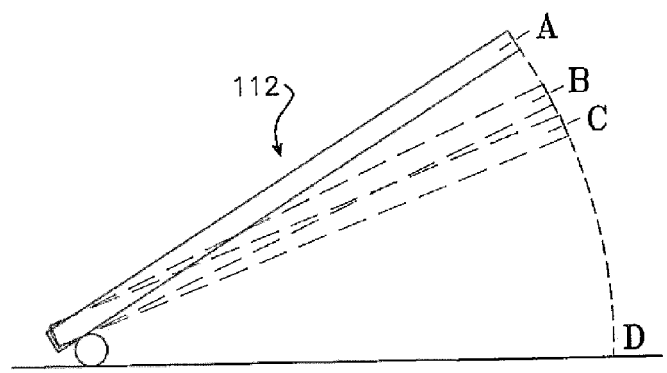
FIG. 11 shows a modified mode of operation of an accelerator pedal of a vehicle fitted with the braking system of the invention.

As shown in FIG. 11 in, for example, a typical floor mounted accelerator pedal, the arc of movement of the pedal as relayed by the engine management system to the control module via cable 122 is divided into first, second and third zones as programmed in the control module 114. The first zone extends from "A" to "B", from the default zero depressed angle of the pedal at "A" over an arc representing a braking zone. While the pedal remains at its default zero depressed angle at "A", but with the engine 100 started and the system switched to ON, the braking system of the invention applies maximum braking force to hold the vehicle stationary. That is, the actuator 116 linked to the brake pedal 118 acts to depress the brake pedal 118 to its maximum extent.

As the vehicle operator applies pressure to move the accelerator pedal towards "B", the actuator 116 gradually allows the brake pedal 118 to return towards its default fully "up" position, thus reaching a full release of the brakes at the point where the accelerator pedal is at the angle denoted by "B". Although there is a corresponding small increase in engine RPM during this movement of the accelerator pedal 112, it is insignificant and causes no conflict with the gradual decrease of braking force.

The second zone from "B" to "C" represents an arc of movement through a neutral zone in which the brakes are fully released but still within an increase of the engine RPM insufficient to urge the vehicle into motion. The final arc of movement from "C" to "D" represents the angle of movement of the accelerator pedal during which engine RPM can increase to full power.

In an alternative preferred arrangement the electrical control cable 130 is routed through the control module 114 of the system to the engine management system 126. The logic circuit of the control module 114 in this instance, modifies the signals received from the encoder to represent a first, second and third zone of rotation for transmission to the engine management system. In this alternative arrangement, rotation of the accelerator pedal through the first zone, that is from "A" to "B" reduces the braking force from maximum to zero (as described before), while maintaining engine RPM at idle. During rotation through the second or neutral zone from "B" to "C", engine RPM still remains at idle. Thus in this arrangement of the system, the control module provides signals to the engine management system so as to commence acceleration of engine RPM from angle of depression at "C" to full power at "D".

Figure 12:
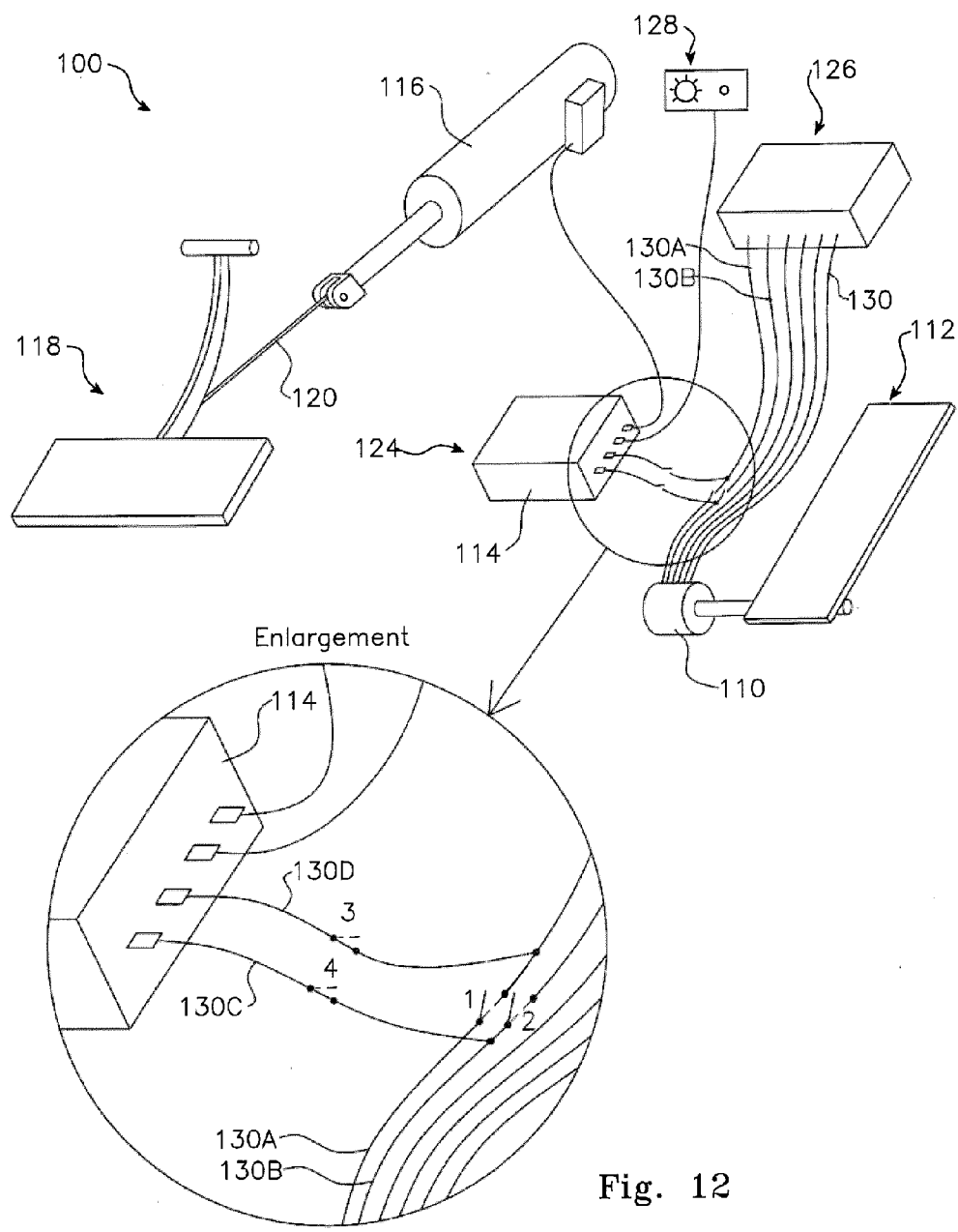
FIG. 12 is a schematic of an alternative connection arrangement to that of the embodiment of FIG. 10.

In a further variation as illustrated in FIG. 12 only those conductors 130 A and 130 B within control cable 130 which relate directly to angular position of pedal 112 are tapped into via tap off conductors 130 C and 130 D. The tap off conductors are monitored by control module 114 so as to provide an indication of angular position of pedal 112.

In a particular preferred form for the purposes of isolation switches denoted X 1, X 2, X 3, X 4 are inserted as illustrated and operate as shown in the inset of FIG. 12 in order to ensure maximum reliability and clear isolation from the engine control module 126 when the braking system is being operated by control module 124.

Thus, this arrangement provides for a non-response, that is, a no increase in RPM zone over the accelerator pedal travel from "A" to "C", through the control module 114 modifying the signals transmitted to the engine management system. While the system of the invention in this alternative arrangement is activated, the signals generated for pedal travel between "C" and "D" are equivalent to those which are generated between "A" and "D" when the system is not in activated mode.

If, with the braking system 100 of the invention activated and the vehicle moving at some speed, the accelerator pedal 112 is released at a rapid rate greater then a predetermined threshold rate, the braking system is triggered to apply the vehicle brakes by the actuator 116 depressing the brake pedal 118. The degree of braking force then applied is a percentage of the full braking force of which the vehicle is capable. The percentage force applied may be selectable by the vehicle's operator from a control cluster 128 mounted within easy reach of the operator driving position.

In at least one preferred embodiment of the system the triggering rate of the release movement of the accelerator pedal 112 is programmable by connection of a programming device to the control module 114 as noted above. In at least one preferred embodiment the percentage of braking force applied is likewise programmable. In a further preferred arrangement, the percentage braking force may be programmable to be a function of the rate of change of accelerator pedal angle anywhere over the range of movement from "D" to "A"; that is, within a range of speed of retraction of an operators foot above the threshold rate, the percentage braking force increases from some threshold value to a predefined maximum as a function of the rate of angular change. Thus the faster the "let up" of the pedal, the greater the braking force applied.

Alternatively, the percentage braking force may have a set value selectable from the system control cluster as noted above. Preferably, the percentage is selectable between zero and 100% of maximum braking force.

In a further preferred arrangement of the braking system of the invention, the percentage braking force applied may be programmed to be a function of the vehicle's speed so that the percentage force to be applied increases with the increasing speed of the vehicle. This is clearly desirable since the application of a high percentage of maximum braking force to a relatively slowly travelling vehicle may have adverse consequences. In this arrangement, the control module of the braking system receives speed data from the vehicle's engine management system. In a further preferred arrangement, the percentage braking force applied may be a function of both the rate of negative angular change and the vehicle speed.

In a further preferred arrangement of the braking system 100 of the invention, the control module 114 is responsive to an engine stall situation based on input from the vehicle's engine management system. When a stall situation is detected, and the braking system is activated, the brakes remain applied until the engine is restarted. Starting the engine after a stall event deactivates the braking system.

In Use

For example, in an emergency or rapid response braking situation, if the accelerator pedal is released at a maximum rate, the actuator may cause 80% of the maximum possible braking force to be applied immediately. This may give the vehicle operator some 0.75 seconds to take over full manual control of the braking action, either to increase it to maximum or, to reduce it. This latter action is provided for, it will be remembered, by the deactivation of the braking system of the invention as soon as a foot makes contact with the brake pedal. It can be demonstrated that the operation of the braking system of the invention can reduce the stopping distance of a vehicle by as much as 15% from the stopping distance under non-assisted emergency braking.

The system of the invention is adaptable to all road vehicles provided with an automatic gearbox, either as a retrofitted system or as original equipment. Although its primary advantage lies in its potential to decrease the stopping distance of a vehicle in an emergency situation, it is also particularly useful in vehicles which are required to stop and start frequently, such as garbage trucks, road sweepers and buses. As an operator removes his or her foot from the accelerator pedal, the brakes are applied and as long as the accelerator pedal remains at its default angle "A" shown in FIG. 11, and the operator has not touched the brake pedal, the vehicle will be held by the brakes until the operator wishes to move forward.

What is claimed is:

1. An accelerator pedal operated braking system for an automatic transmission vehicle; said braking system including monitoring of angular data and angular rate of change data of an accelerator pedal of said vehicle; said system further including a control module and an actuator acting on the brake pedal of said vehicle; said braking system responsive to said angular data and angular rate of change data wherein said actuator of said vehicle is connected to said brake pedal; said actuator responsive to said angular status and angular rate of change as monitored by said control module of said system; said actuator arranged to depress said brake pedal from a default zero applied braking force position to at least a percentage of a maximum applied braking force position and wherein, while said engine is initially in idle mode and said braking system is in activated mode, a first zone of rotation of said accelerator pedal from a default non-rotated angle to a first rotated angle causes said actuator to gradually reduce braking force from a maximum applied braking force to zero applied braking force; said first zone of rotation forming a first portion of said movement of said accelerator pedal during which an increase in engine RPM is insufficient to urge said vehicle into motion.

2. The braking system of claim 1 wherein said braking system is triggered to apply at least a percentage of maximum braking force when a negative angular rate of change of said accelerator pedal exceeds a predefined threshold value.

3. The braking system of claim 1 wherein said angular data and said angular rate of change data of said accelerator pedal are monitored by a potentiometer responsive to rotation of said accelerator pedal.

4. The braking system of claim 3 wherein said potentiometer is an original equipment potentiometer of an electronically enabled accelerator pedal or an potentiometer retrofitted to said accelerator pedal.

5. The braking system of claim 1 wherein said control module receives a signal from said vehicles' engine management system; said signal indicating instantaneous said angular status and angular rate of change of said accelerator pedal.

6. The braking system of claim 1 wherein, while said braking system is in activate mode, operation of said accelerator pedal is modified from a standard default operating mode in which all movement of said accelerator pedal varies RPM of an engine of said vehicle, to an operating mode in which a portion of movement of said accelerator pedal has no effect on said engine RPM.

7. The braking system of claim 5 wherein, while said engine is in idle mode such that said accelerator pedal is in a default fully retracted position, and when said braking system is in activated mode, said actuator acts on said brake pedal to apply maximum braking force.

8. The braking system of claim 1 wherein the braking system, while said braking system is in activated mode, has a second zone of rotation of said accelerator pedal from said first rotated angle to a second rotated angle that forms a second portion of said movement of said accelerator pedal during which said system applies zero braking force.

9. The braking system of claim 1 wherein, while said braking system is in activated mode, said braking system has a final zone of rotation of said accelerator pedal from said second rotation angle to a maximum rotated position controls change of said engine RPM to full power.

10. The braking system of claim 3 wherein signals from said potentiometer are routed through said control module to said engine management system of said vehicle; said control module modifying said signals to divide rotation of said accelerator pedal into first, second and third zones.

11. The braking system of claim 10 wherein when said system is enabled and said engine of said vehicle is on, during rotation of said accelerator through said first zone extending from zero rotation to a first angle of rotation, said braking force applied by said system decreases from a maximum to zero braking force, and wherein engine RPM remains at idle during said rotation.

12. The braking system of claim 10 wherein during rotation of said accelerator pedal through said second zone engine RPM remains at idle; rotation through said third zone increasing engine RPM from idle to full power.

13. The braking system of claim 10 wherein said control module provides for said final zone of rotation to control engine RPM over the same range as the range over full movement of said accelerator pedal when said braking system is in deactivated mode.

14. The braking system of claim 9 wherein, while said braking system is activated and said vehicle is in motion and while said pedal angle is in said final zone of rotation, a negative rotational change of said accelerator pedal towards said second rotation angle at said angular rate of change exceeding said predefined threshold value, causes said actuator to act on said brake pedal to apply at least said percentage of maximum braking force.

15. The braking system of claim 1 wherein said system is switchable from a deactivated mode to an activated mode by means of a control cluster mounted proximate to an operator of said vehicle.

16. The braking system of claim 15 wherein said control cluster includes a selector for selection of said at least a percentage of said maximum braking force.

17. The braking system of claim 14 wherein, while said system is in said activated mode, contact of an operator's foot with said brake pedal switches said system to a deactivated state.

18. The braking system of claim 1 wherein said control module is provided with an input port for connection of a programming device; said programming device provided with software enabling customization of operating parameters of said system.

19. The braking system of claim 1 wherein, when a stall situation is detected, and said braking system is in activated mode, the brakes remain applied until the vehicle engine is restarted, and wherein starting said engine after a stall event deactivates said braking system.

20. An accelerator pedal operated braking system for an automatic transmission vehicle; said braking system including monitoring of angular data and angular rate of change data of an accelerator pedal of said vehicle; said system further including a control module and an actuator acting on the brake pedal of said vehicle; said braking system responsive to said angular data and angular rate of change data wherein said angular data and said angular rate of change data of said accelerator pedal are monitored by an encoder responsive to rotation of said accelerator pedal wherein signals from said encoder are routed through said control module to said engine management system of said vehicle; said control module modifying said signals to divide rotation of said accelerator pedal into first, second and third zones and wherein when said system is enabled and said engine of said vehicle is on, during rotation of said accelerator through said first zone extending from zero rotation to a first angle of rotation, said braking force applied by said system decreases from a maximum to zero braking force, and wherein engine RPM remains at idle during said rotation.

21. The braking system of claim 20 wherein during rotation of said accelerator pedal through said second zone engine RPM remains at idle; rotation through said third zone increasing engine RPM from idle to full power.

22. The braking system of claim 20 wherein said control module provides for said final zone of rotation to control engine RPM over the same range as the range over full movement of said accelerator pedal when said braking system is in deactivated mode.

* * * * *